July 29, 1924.

J. WERZ 1,503,221

DEVICE FOR TRANSMITTING THE ROTARY MOTION OF A MOTOR TO THE WHEELS OF VEHICLES

Filed Oct. 5, 1923

Inventor
Jacob Werz
By his Attorneys.

Patented July 29, 1924.

1,503,221

UNITED STATES PATENT OFFICE.

JACOB WERZ, OF GENEVA, SWITZERLAND, ASSIGNOR TO SOCIÉTÉ ANONYME DES ATELIERS DE SÉCHERON, OF GENEVA, SWITZERLAND, A CORPORATION OF SWITZERLAND.

DEVICE FOR TRANSMITTING THE ROTARY MOTION OF A MOTOR TO THE WHEELS OF VEHICLES.

Application filed October 5, 1923. Serial No. 666,680.

*To all whom it may concern:*

Be it known that I, JACOB WERZ, a citizen of Switzerland, residing at Geneva, Canton of Geneva, in the Confederation of Switzerland, have invented certain new and useful Improvements in or Relating to Devices for Transmitting the Rotary Motion of a Motor to the Wheels of Vehicles, of which the following is a specification.

This invention relates to improvements in devices for use on vehicles, more particularly electric vehicles, for transmitting the rotary motion of a motor mounted rigidly on the vehicle frame to a set of wheels provided with side play relatively to the frame.

Well known devices of the kind comprise a sleeve or quill surrounding the driving axis driven by the motor by means of gearing. Through the said quill passes the axle of the said set of wheels, and the rotary motion of the motor is transmitted to the said wheels by any kind of coupling so arranged that the quill and the axle of the said set of wheels can move in the vertical direction relatively to each other. Owing to the lateral side play of the set of wheels relatively to the vehicle frame, the running of the vehicles on curves can be improved for instance either by providing a certain amount of side play for the single sets of wheels, or by combining a set of wheels having lateral play with another set of wheels so as to form a bogie as is the case in the Krauss-Helmholtz bogies.

It has been found that the design of a flexible coupling that allows at the same time both a vertical and a lateral movement of the set of wheels relatively to the quill offers certain difficulties. When the lateral play is ample it unfavourably affects the vertical play.

According to the invention this disadvantage is avoided by mounting the quill with side play relatively to the vehicle frame and to the motor.

A construction of the device is illustrated by way of example in the accompanying drawing in which.

Figure 1:
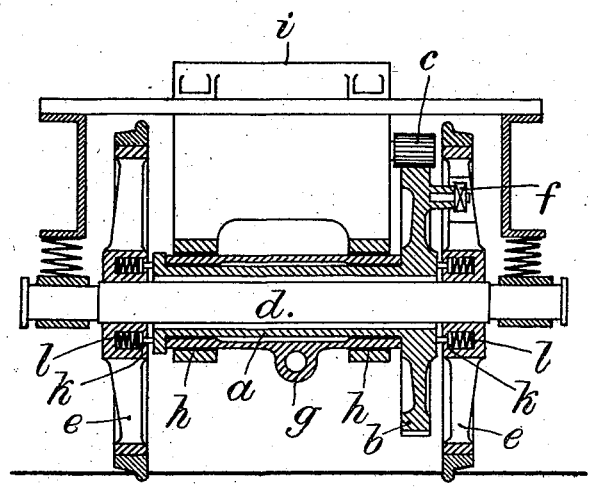
Figure 1 is a vertical section through the said construction, whilst

The quill $a$, which is driven by a gear wheel $b$ mounted on the said quill and a pinion $c$ secured to the shaft of the motor $i$, encloses the driving axle $d$ on which are mounted the wheels $e$, whilst $f$ indicates any suitable coupling between the quill $a$ and the driving wheels. This coupling is of such a design that the driving axle $d$ can move in the vertical direction relatively to the quill $a$.

The quill is guided in a casing $g$ which casing itself is supported at $h$ on the motor $i$ in such a way, that it can be laterally displaced.

Into the hubs of the wheels $e$ are inserted a number of springs $l$ provided with steel heads $k$. These springs are intended, on the one hand, to take up lateral shocks transmitted by the driving wheel to the quill, and on the other hand to enable the driving axle $d$ to take up an oblique position relatively to the quill $a$. Otherwise the axle $d$ could assume an oblique position relatively to the quill $a$ only if lateral play were provided between the quill and the hubs of the driving wheels, which however should be avoided as much as possible on account of the risk of lateral shocks. On the other hand, inaccurate mounting or displacement in service, or one sided jumping of the driving wheel set has always to be taken into account.

The wheel set in question forms with another wheel set, not shown in the drawing, a Krauss-Helmholtz bogie. The lever which produces the lateral shifting, engages with the casing $g$ so that the said lever moves the casing together with the quill and the set of wheels.

When such a wheel set arrives on a curve, the casing $g$, the quill $a$ as well as the whole set of wheels will be simultaneously shifted. As the driving motor $i$ with the pinion $c$ is rigidly mounted on the vehicle frame, the gear wheel $b$ will be displaced relatively to the pinion $c$. For that reason, the pinion $c$ is preferably made wider than the gear wheel $b$, so that the whole width of the latter should aways remain in contact with the pinion.

Figure 2:
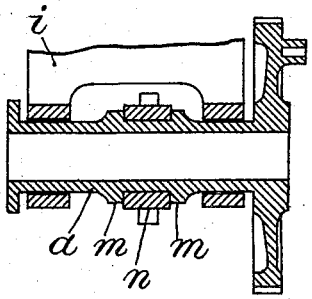
Figure 2 shows a modified construction.

According to Fig. 2, the quill $a$, instead of being mounted in a casing which can be laterally displaced, is mounted directly on the motor $i$. When using this arrangement in combination with a Krauss-Helmholtz bogie, one end of the lever bringing about the lateral movements engages directly with the quill by means of a ring $n$ running between two collars, or bosses $m$ on the quill $a$. The said lever could engage with the quill in any other suitable manner.

In the case of a set of driving wheels which is not combined with another set of wheels to form a bogie but which has merely free lateral play, as is often the case in locomotives with several sets of driving wheels for the intermediate axles, the quill would also preferably be mounted as shown in Figure 2, in which case the collars or bosses $m$ would be omitted as the lateral movement of the quill would be brought about by the set of wheels.

The coupling for transmitting the rotary motion of the quill to the set of the wheels could also be constituted by or be provided with, springs.

Having now particularly described and ascertained the nature of my said invention, and in what manner the same is to be performed, I declare that what I claim is:

1. In a device for use on vehicles, more particularly electric vehicles, for transmitting the rotary motion of a motor rigidly mounted on the vehicle frame, to a set of wheels with side play relatively to the vehicle frame, said device comprising a motor, a quill driven by said motor, means for gearing the axle of said wheel set arranged so as to pass through said motor driven quill, a coupling for transmitting the rotation of the quill to the set of wheels in such a manner that the quill and the axle of the set of wheels can move vertically relatively to each other, being at the same time arranged in such a manner that a lateral play is provided for between the quill relatively to the vehicle frame and to the motor.

2. A device as in claim 1, in which a lever is provided for producing the lateral movement of the quill, said lever being mounted by means of a ring and collars or bosses on the said quill.

3. A device as in claim 1, in which springs are arranged between the quill and the hubs of the wheels of the said wheel set, for the purpose of taking up lateral shocks.

4. A device as in claim 1, in which the gear wheels for transmitting the rotary motion of the motor to the quill are made of different widths.

In testimony whereof I have affixed my signature in presence of two witnesses.

JACOB WERZ.

Witnesses:
MAURICE IMEY,
Dr. ROD DE WURSTEMBERGER.